US011292627B1

(12) United States Patent
Bistline

(10) Patent No.: US 11,292,627 B1
(45) Date of Patent: Apr. 5, 2022

(54) CABLE WRAPPING SYSTEM

(71) Applicant: Torrance Clayne Bistline, Hildale, UT (US)

(72) Inventor: Torrance Clayne Bistline, Hildale, UT (US)

(*) Notice: Subject to any disclaimer, the term of this patent is extended or adjusted under 35 U.S.C. 154(b) by 0 days.

(21) Appl. No.: 17/491,772

(22) Filed: Oct. 1, 2021

Related U.S. Application Data

(60) Provisional application No. 63/136,548, filed on Jan. 12, 2021.

(51) Int. Cl.
| | |
|---|---|
| *B65B 13/10* | (2006.01) |
| *B65B 27/10* | (2006.01) |
| *B65B 13/18* | (2006.01) |
| *F16L 3/233* | (2006.01) |

(52) U.S. Cl.
CPC ............ *B65B 13/10* (2013.01); *B65B 13/186* (2013.01); *B65B 27/10* (2013.01); *F16L 3/233* (2013.01)

(58) Field of Classification Search
CPC ....... B65B 13/186; B65B 13/10; B65B 11/04; B65B 11/045; B65B 25/24; B65B 27/06; B65B 27/10; A01F 15/071; A01F 15/14; A01F 15/141; H01B 13/10; H01B 13/26; F16L 3/233
USPC ....................................... 100/13, 15; 53/587
See application file for complete search history.

(56) References Cited

U.S. PATENT DOCUMENTS

| | | | |
|---|---|---|---|
| 1,728,442 A * | 9/1929 | Peck | B65B 13/02 100/15 |
| 2,227,602 A | 1/1941 | Platt | |
| 2,681,184 A | 6/1954 | Thomas | |
| 3,262,246 A * | 7/1966 | Olsen | B65B 27/105 100/15 |
| 3,641,666 A | 2/1972 | Scaminaci et al. | |
| 3,692,250 A | 9/1972 | Lee et al. | |
| 3,827,650 A | 8/1974 | Stevens et al. | |
| 4,024,696 A | 5/1977 | Townsend | |
| 4,205,513 A | 6/1980 | Shokoples | |
| 4,285,190 A * | 8/1981 | Ermachkov | A01F 15/07 56/341 |
| 4,790,896 A | 12/1988 | Schmalholtz | |
| 5,114,119 A | 5/1992 | Theurer et al. | |
| 5,397,070 A | 3/1995 | Yano | |
| 5,573,627 A * | 11/1996 | Vuong | B65H 81/08 156/577 |

(Continued)

FOREIGN PATENT DOCUMENTS

| | | | |
|---|---|---|---|
| CN | 211294751 | 8/2020 | |
| GB | 1518838 A * | 7/1978 | ........... D07B 7/14 |
| WO | WO-2010061217 A2 * | 6/2010 | ........... B65B 27/10 |

*Primary Examiner* — Jimmy T Nguyen
(74) *Attorney, Agent, or Firm* — Gurr Brande & Spendlove, PLLC; Robert A. Gurr

(57) ABSTRACT

A cable wrapper has a carriage coupled to a main frame with a plurality of twine compartments coupled to the carriage, each twine compartment comprising a roll of twine. The twine of each twine compartment is fed into the carriage. A plurality of cables are pulled through the carriage and the twine of each twine compartment is secured to the cables. As the cable is then pulled through the carriage, the twine is pulled and, via one or more pulley systems, causes the carriage to rotate. As the carriage rotates, the twine from each twine compartment wraps the cables, ensuring they are secured together their entire length.

20 Claims, 18 Drawing Sheets

(56) References Cited

U.S. PATENT DOCUMENTS

| | | | |
|---|---|---|---|
| 6,042,040 | A | 3/2000 | Kurita et al. |
| 6,199,829 | B1 | 3/2001 | Brown et al. |
| 6,370,753 | B1 | 4/2002 | Washburn |
| 6,491,475 | B1 | 12/2002 | Shimizu |
| 6,705,060 | B1 | 3/2004 | McGuinness et al. |
| 8,220,230 | B2 * | 7/2012 | Su .......................... B65B 27/06 100/15 |
| 10,613,289 | B2 | 4/2020 | Yogeeswaran et al. |
| 2005/0006893 | A1 | 1/2005 | Bulich |
| 2007/0181244 | A1 | 8/2007 | Billing et al. |

* cited by examiner

CABLE WRAPPING SYSTEM

CROSS-REFERENCE TO RELATED APPLICATIONS

This application claims the benefit of U.S. Provisional Application Ser. No. 63/136,548, filed Jan. 12, 2021, which is incorporated herein by reference in its entirety.

TECHNICAL FIELD

The present disclosure relates to machines that bundle cables. More particularly, the present disclosure relates to a non-powered apparatus for bundling cables together.

BACKGROUND

Cables are often bundled when placed in trenches for underground placement. To ensure the cables remain grouped, they are bound together at regular intervals. For example, it is common to place a zip-tie or other tying device every three feet. Because the zip-tie is secured by hand, the process is tedious, time-consuming, and can lead to soreness and injury as a result of the constant bending to tie the cables together. Because tying is done by hand, the intervals may not be accurate and the cables may tend to bunch or loosen in unbound sections. Additionally, because of the time involved in hand tying the cables, the overall time to complete the project is lengthened, making it more expensive (e.g., increased labor).

As a result, there is a need for an apparatus that can efficiently wrap cables for in-ground placement, thereby more accurately securing the cables, reducing labor, and mitigating back injuries. Accordingly, the present disclosure seeks to solve these and other problems.

SUMMARY OF EXAMPLE EMBODIMENTS

In some embodiments, a cable wrapper comprises a carriage coupled to a main frame with a plurality of twine compartments coupled to the carriage, each twine compartment comprising a roll of twine. The twine of each twine compartment is fed into the carriage. A plurality of cables are pulled through the carriage and the twine of each twine compartment is secured to the cables. As the cable is then pulled through the carriage, the twine is pulled and, via one or more pulleys causes the carriage to rotate. As the carriage rotates, the twine from each twine compartment wraps the cables, ensuring they are secured together their entire length.

In some embodiments, a first twine compartment is coupled to the carriage proximate a first twine tensioner, a first guide first roller, a first v-belt pulley, and a first guide second roller. A first twine is threaded through the first twine tensioner, the first guide first roller, the first v-belt pulley, and the first guide second roller. A second twine compartment is coupled to the carriage proximate a second twine tensioner, a second guide first roller, a second v-belt pulley, and a second guide second roller. A second twine is threaded through the second twine tensioner, the second guide first roller, the second v-belt pulley, and the second guide second roller. A third twine compartment is coupled to the carriage proximate a third twine tensioner, a third guide first roller, a third v-belt pulley, and a third guide second roller. A third twine is threaded through the third twine tensioner, the third guide first roller, the third v-belt pulley, and the third guide second roller. The twine from the first twine compartment, second twine compartment, and third twine compartment passes through and exits the carriage at a second, back end, where each is coupled to a plurality of cables passing through the carriage from a first, front end to the second, back end. As the cable is pulled through the carriage, such as by pulling the main frame forward using a truck, the first twine, the second twine, and the third twine to wrap around the cables as the cables exit the carriage.

DETAILED DESCRIPTION OF EXAMPLE EMBODIMENTS

Figure 1:
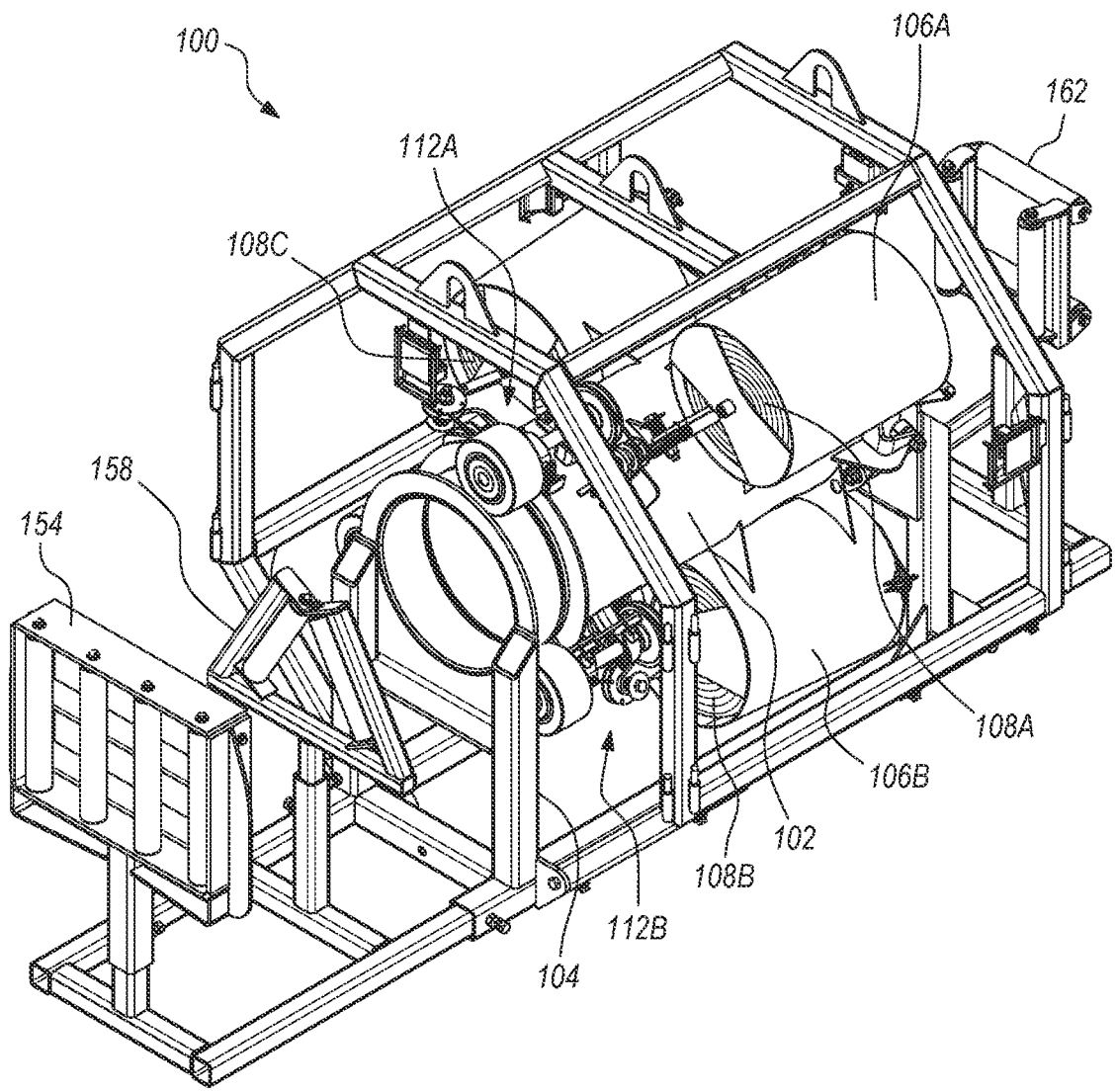
FIG. 1 illustrates a top, right front perspective view of a cable wrapper.
Figure 2:
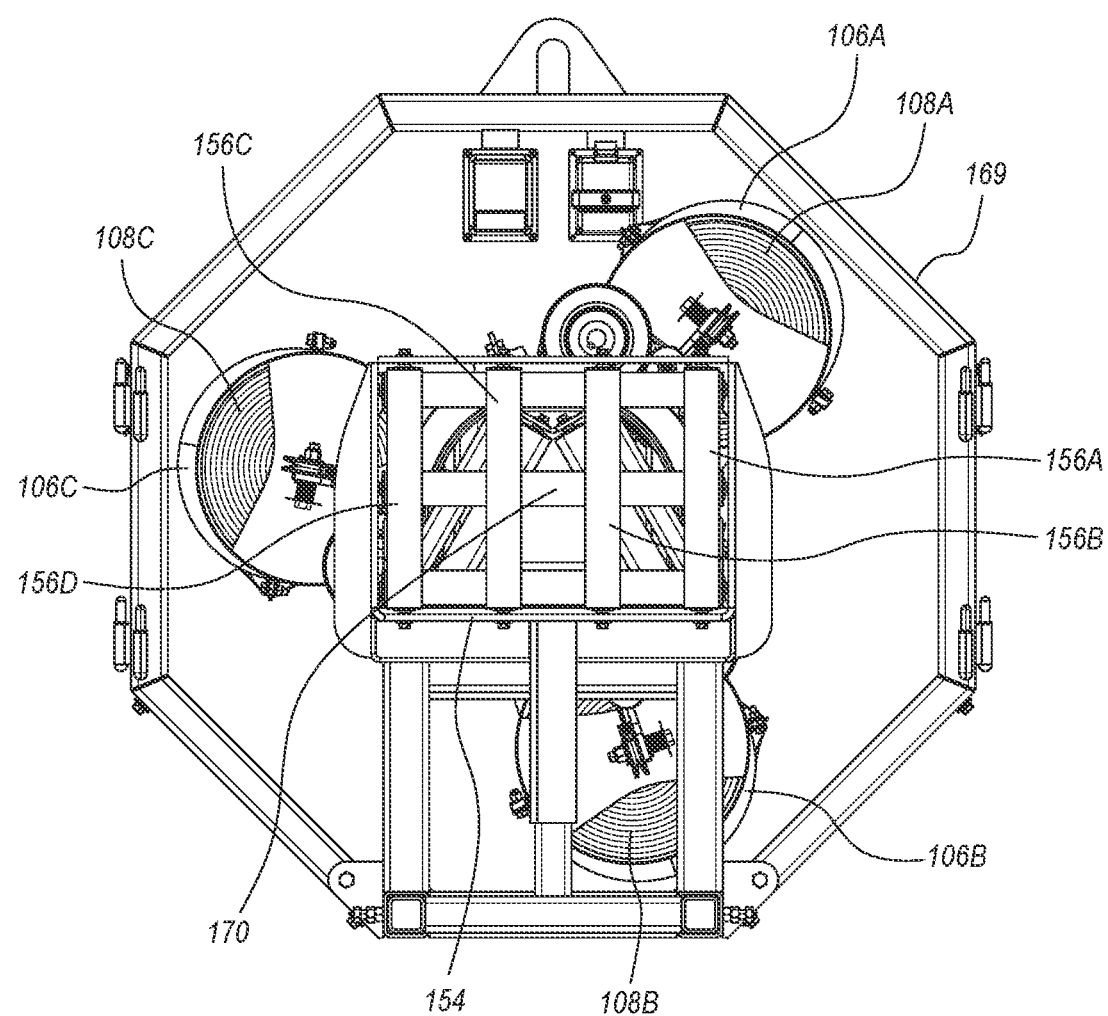
FIG. 2 illustrates a front elevation view of a cable wrapper.
Figure 3:
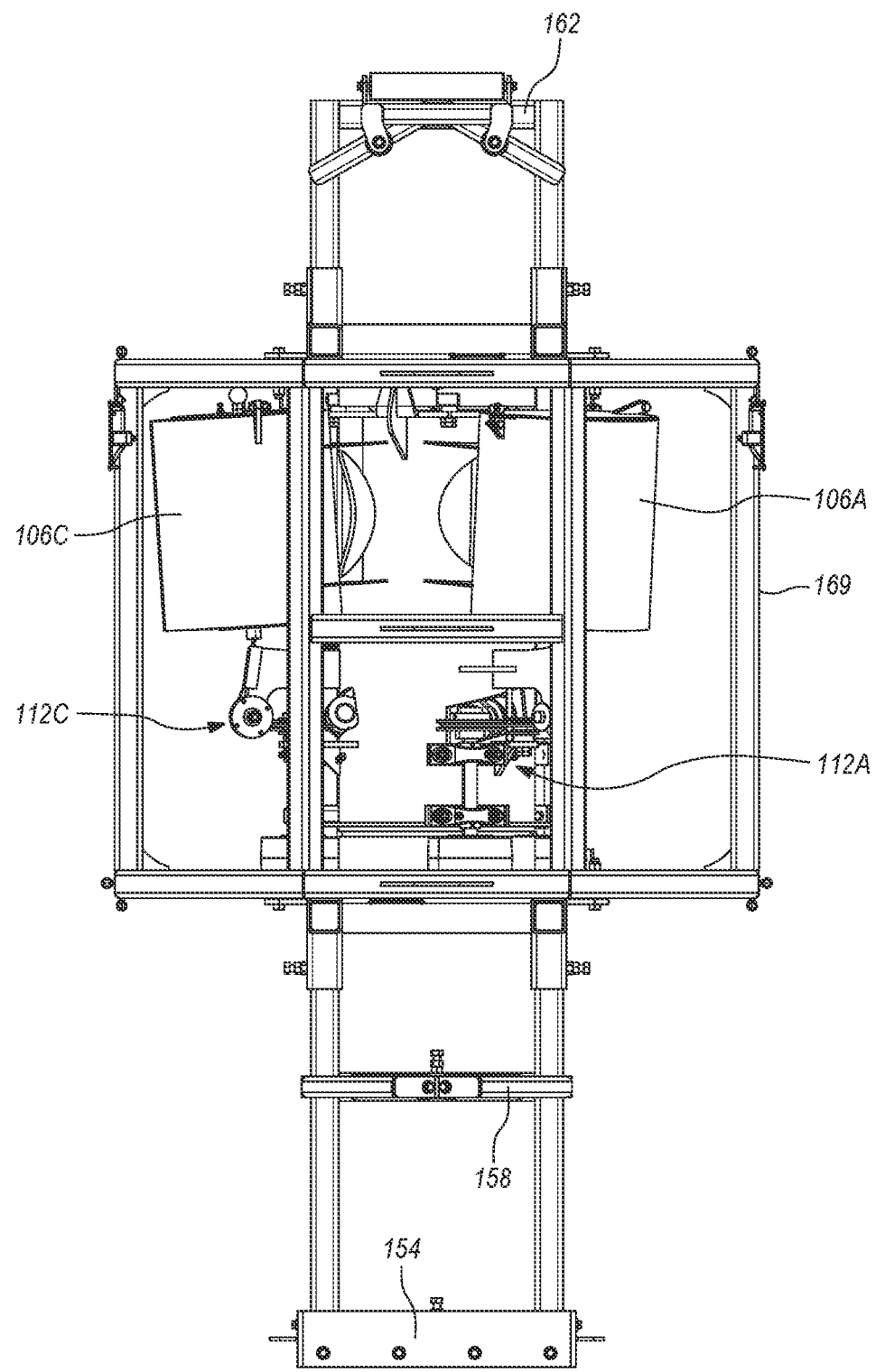
FIG. 3 illustrates a top plan of a cable wrapper.
Figure 4:
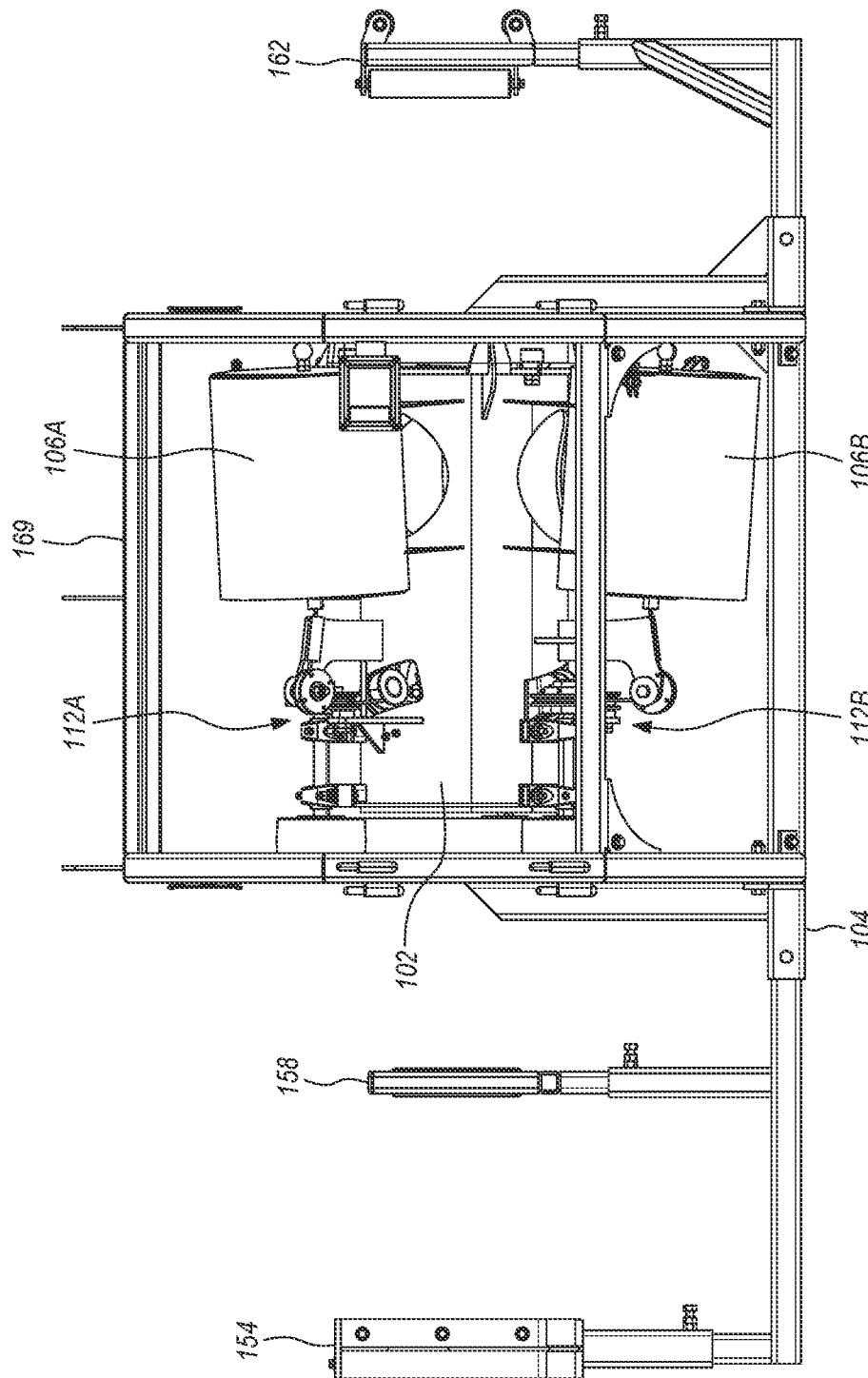
FIG. 4 illustrates a right side elevation view of a cable wrapper.
Figure 5:
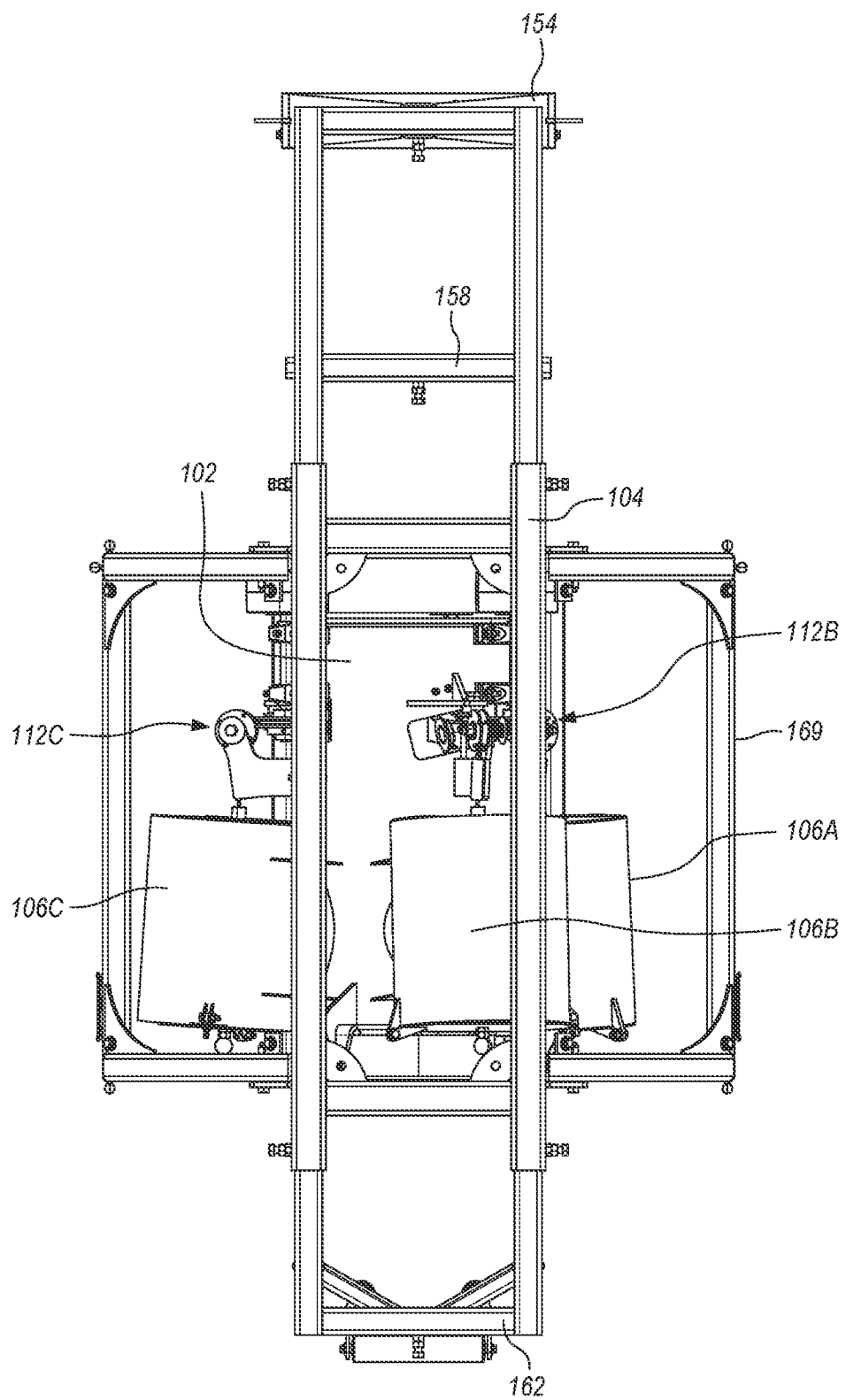
FIG. 5 illustrates a bottom plan view of a cable wrapper.
Figure 6:
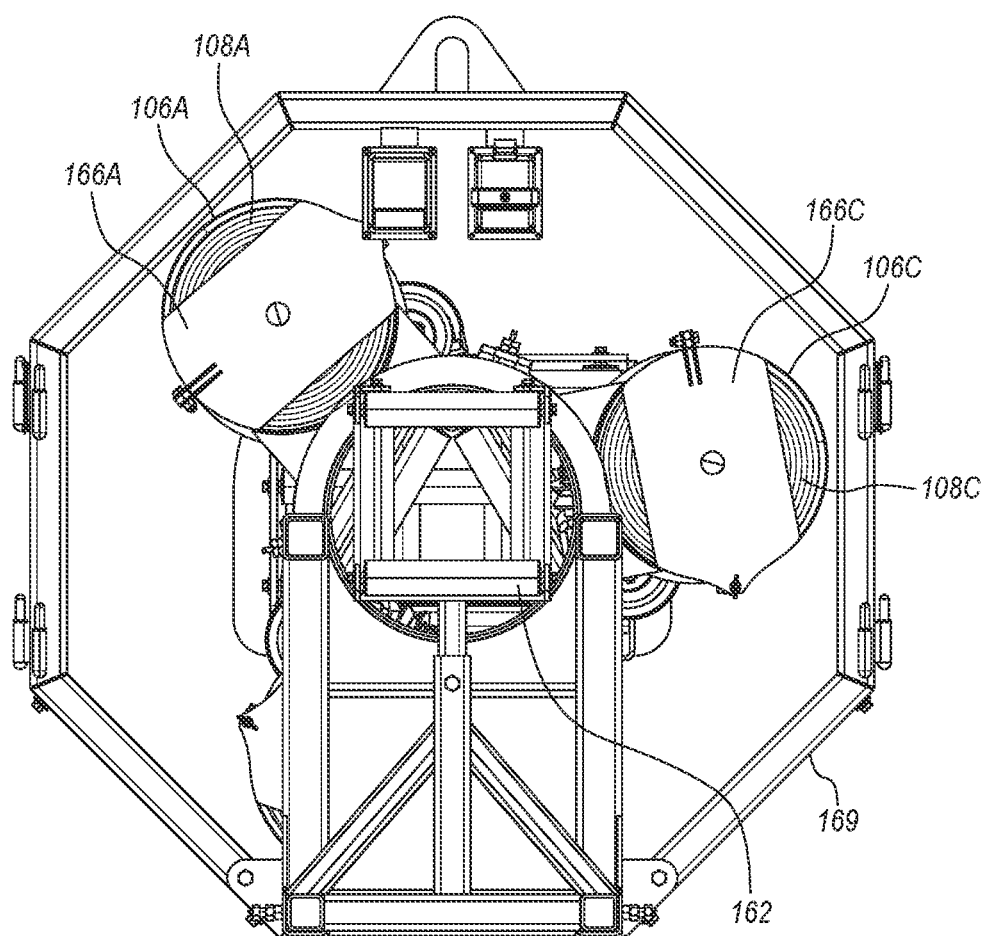
FIG. 6 illustrates a rear elevation view of a cable wrapper.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As previously discussed, there is a need for an apparatus that can efficiently wrap cables for in-ground placement, thereby more accurately securing the cables, reducing labor, and mitigating back injuries. The cable wrapper disclosed herein solves these and other problems.

In some embodiments, as shown in FIGS. 1-6, a cable wrapper 100 comprises a carriage 102 coupled to a main frame 104 with a plurality of twine compartments 106A-C coupled to the carriage 102, each twine compartment 106A-C comprising a roll of twine 108A-C. The twine 108A-C of each twine compartment 106A-C is fed into the carriage 102. A plurality of cables 110A-D (as best seen in FIGS. 12-15) are pulled through the carriage 102 and the twine 108A-C of each twine compartment 106A-C is secured to a first end of the cables 110A-D. As the cables 110A-D are then pulled through the carriage 102, the twine 108A-C is pulled and, via one or more pulley systems 112A-C causes the carriage 102 to rotate. As the carriage 102 rotates, the twine 108A-C from each twine compartment 106A-C wraps the cables 110A-D, ensuring they are secured together their entire length.

Figure 7:
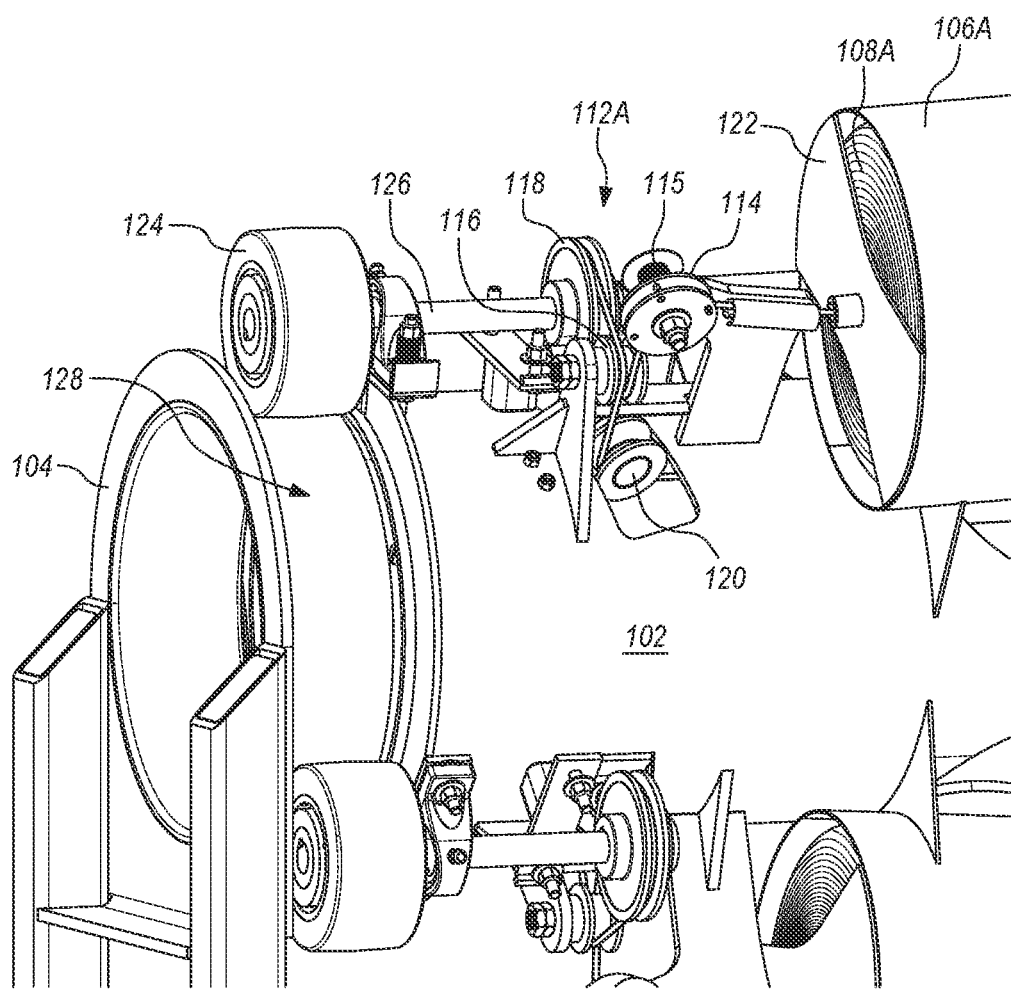
FIG. 7 illustrates a right, front detailed perspective view of a pulley system of a cable wrapper.

In some embodiments, as shown in FIG. 7, a first twine compartment 106A is coupled to the carriage 102 and is coupled to a first pulley system 112A. The first pulley system 112A comprises a first twine tensioner 114, a first guide first roller 116, a first v-belt pulley 118, and a first guide second roller 120. The first roll of twine 108A is fed out a front end 122 of the twine compartment 106A, around the first twine tensioner 114, around the first guide first roller 116, around the first v-belt pulley 118, returned around the first guide first roller 116, and into the carriage 102 around the first guide second roller 120. From there, the first roll of twine 108A may be secured (e.g., tied, taped, interlaced, etc.) to the cables to be wrapped. As the cables 110A-D (best seen in FIGS. 12-15) are pulled through the carriage 102 with each roll of twine secured thereto as described above, the carriage 102 rotates, wrapping the cables 110A-D with the twine 108A-D. For example, the first pulley system 112A drives a first wheel 124 via a first drive draft 126 coupled to the first v-belt pulley 118. As twine is pulled through the first pulley system 112A, the first wheel 124 rotates on the frame 104 in wheel channel 128, causing the carriage 102 and the components coupled thereto (e.g., twine compartments 106A-C, pulley systems 112A-C) to rotate, thereby encircling (wrapping) the cables 110A-D as they pass through the carriage 102.

It will be appreciated that each pulley system 112A-C comprises the components described above with regard to the first pulley system 112A. As a result, fewer or more pulley systems may be used. For example, in one embodiment, only one twine compartment 106A and pulley system 112A is required. In other embodiments, a plurality of twine compartments 106A-C and pulley systems 112A-C may be used, which is not limited to three as shown.

Figure 8:
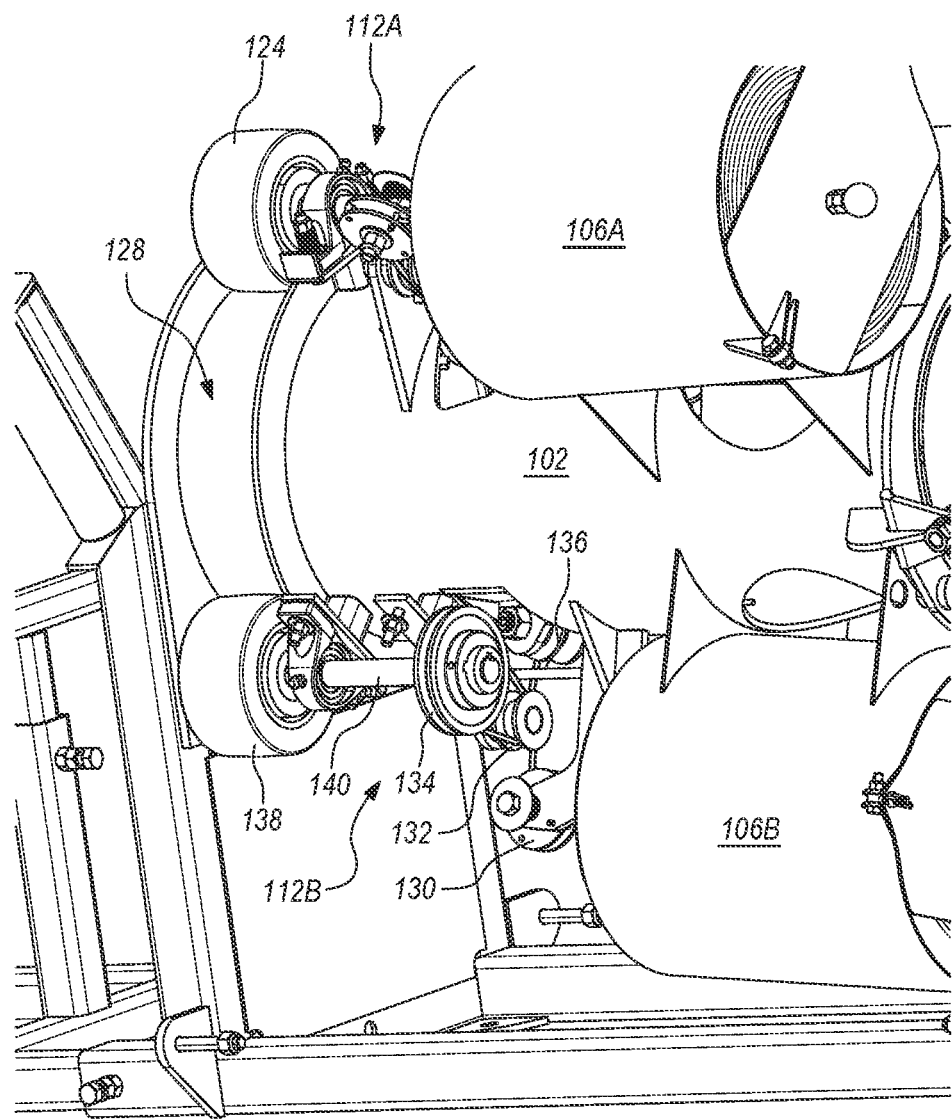
FIG. 8 illustrates a right, rear detailed perspective view of a pulley system of a cable wrapper.
Figure 9:
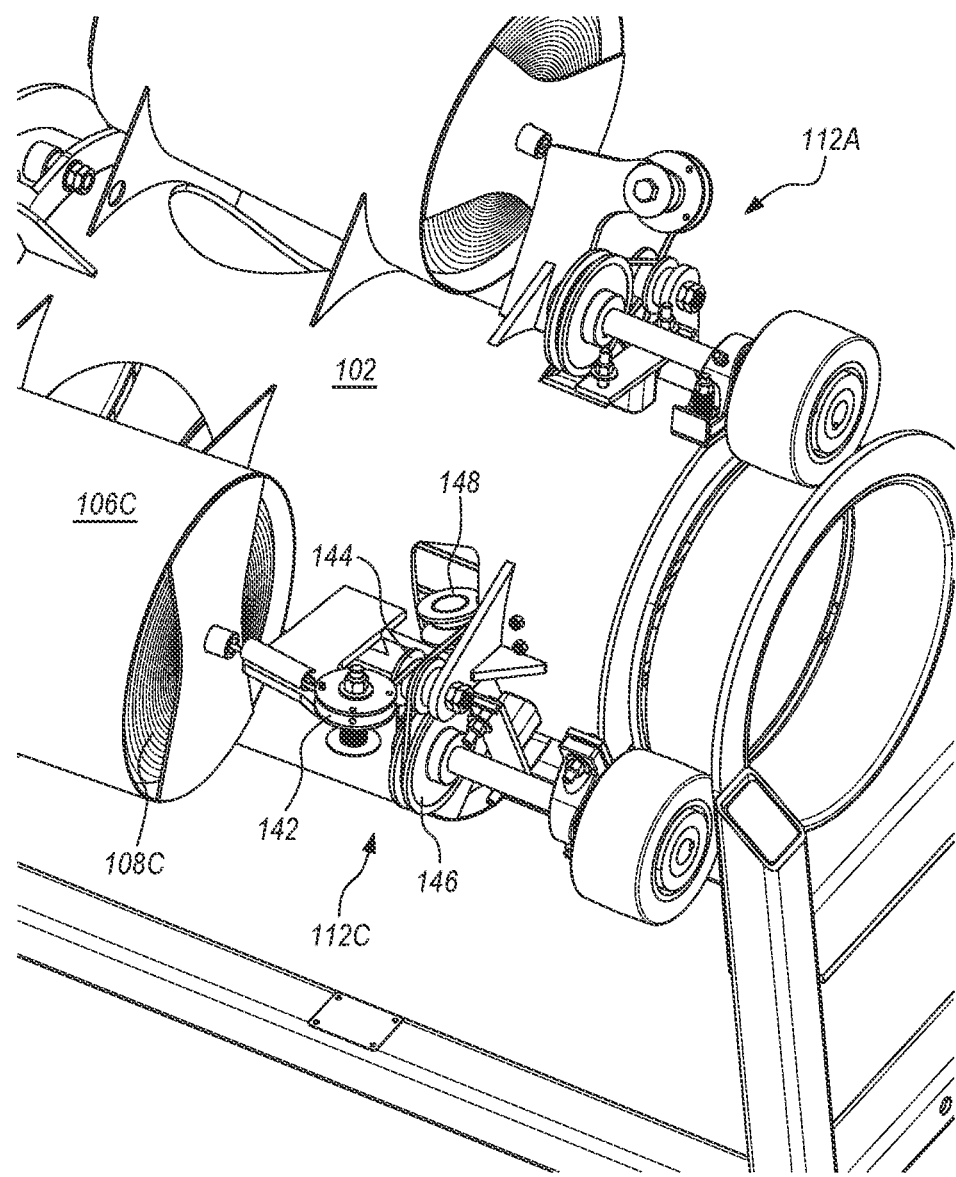
FIG. 9 illustrates a left, front detailed perspective view of a pulley system of a cable wrapper.
Figure 18:
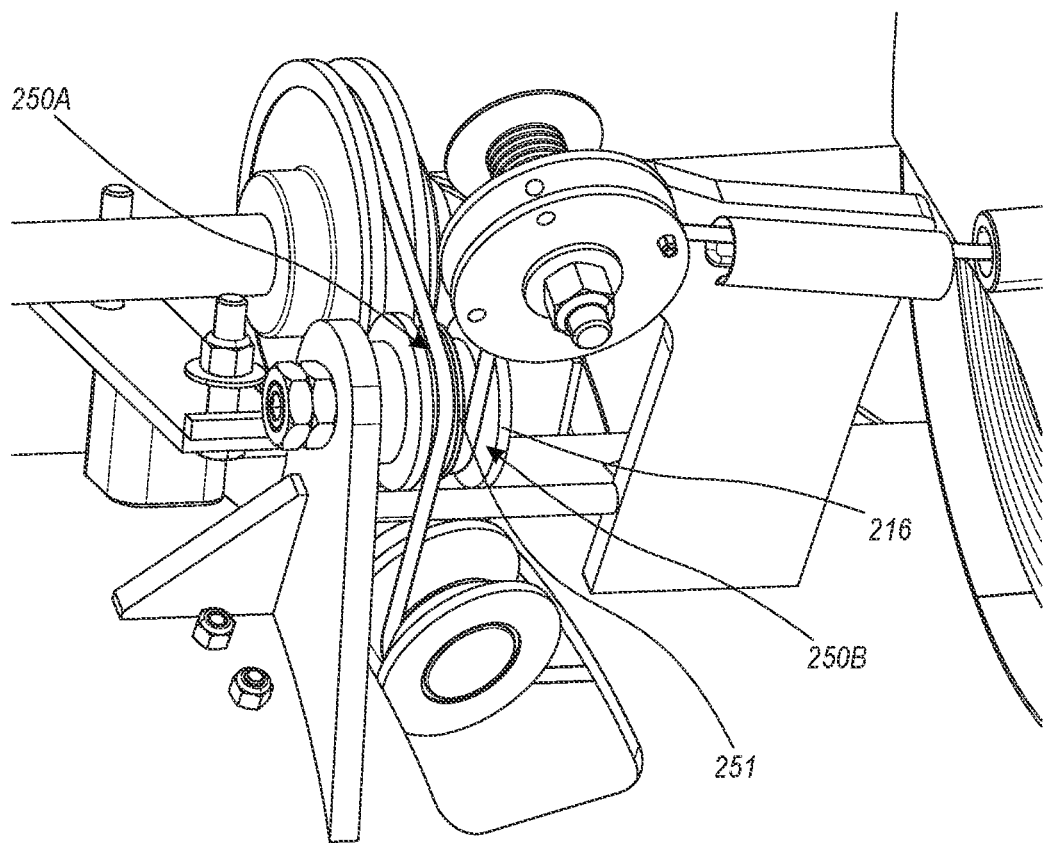
FIG. 18 illustrates a detailed view of a pulley system of a cable wrapper.

In a cable wrapper 100 comprising three twine compartments 106A-C, as best seen in FIGS. 7-9, a first twine compartment 106A is coupled to the carriage 102 proximate a first twine tensioner 114 (which may be spring 115 controlled), a first guide first roller 116, a first v-belt pulley 118, and a first guide second roller 120. A first twine 108A is threaded through the first twine tensioner 114, to the first guide first roller 116, to the first v-belt pulley 118, returned around the first guide first roller 116, and to the first guide second roller 120. As shown in FIG. 8, a second twine compartment 106B is coupled to the carriage 102 proximate a second twine tensioner 130, a second guide first roller 132, a second v-belt pulley 134, and a second guide second roller 136. A second twine 108B is threaded through the second twine tensioner 130, to the second guide first roller 132, the second v-belt pulley 134, back around the second guide first roller 132, and to the second guide second roller 136. The second pulley system 112B further comprises a second wheel 138 and drive shaft 140 coupled to the second v-belt pulley 134. As shown in FIG. 9, a third twine compartment 106 C is coupled to the carriage 102 proximate a third twine tensioner 142, a third guide first roller 144, a third v-belt pulley 146, and a third guide second roller 148. A third twine 108C is threaded through the third twine tensioner 142, to the third guide first roller 144, the third v-belt pulley 146, back around the third guide second roller 148, and to the third guide second roller 148. It will be appreciated that, in some embodiments, each first roller 116, 132, 146 may have two channels to prevent the twine going in opposite directions thereon from tangling and binding. For example, FIG. 18 illustrates a first roller 216 having two channels 250A, 250B separated by a divider 251.

Figure 10:
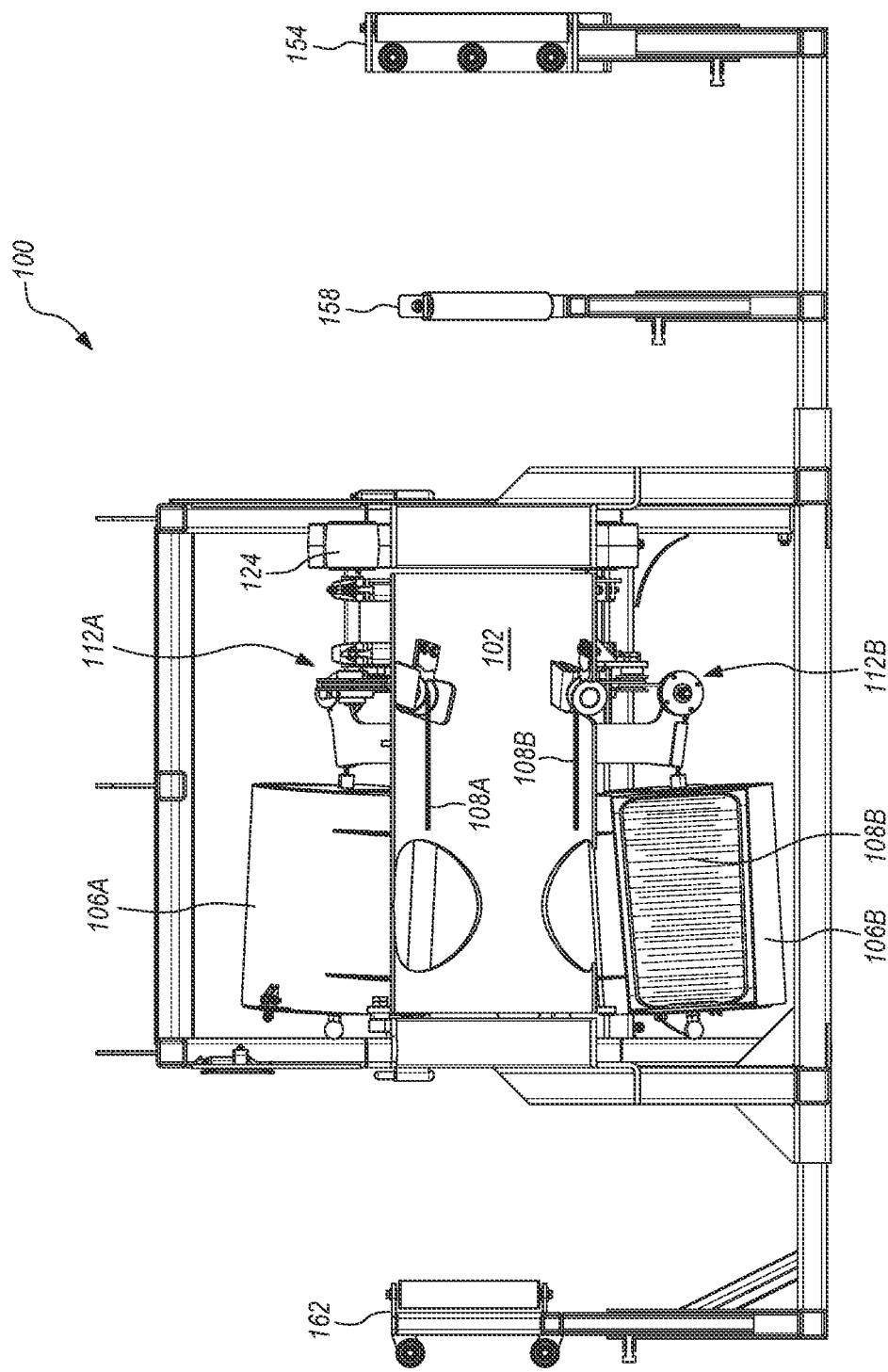
FIG. 10 illustrates a left side elevational, longitudinal cross-section view of a cable wrapper.
Figure 11:
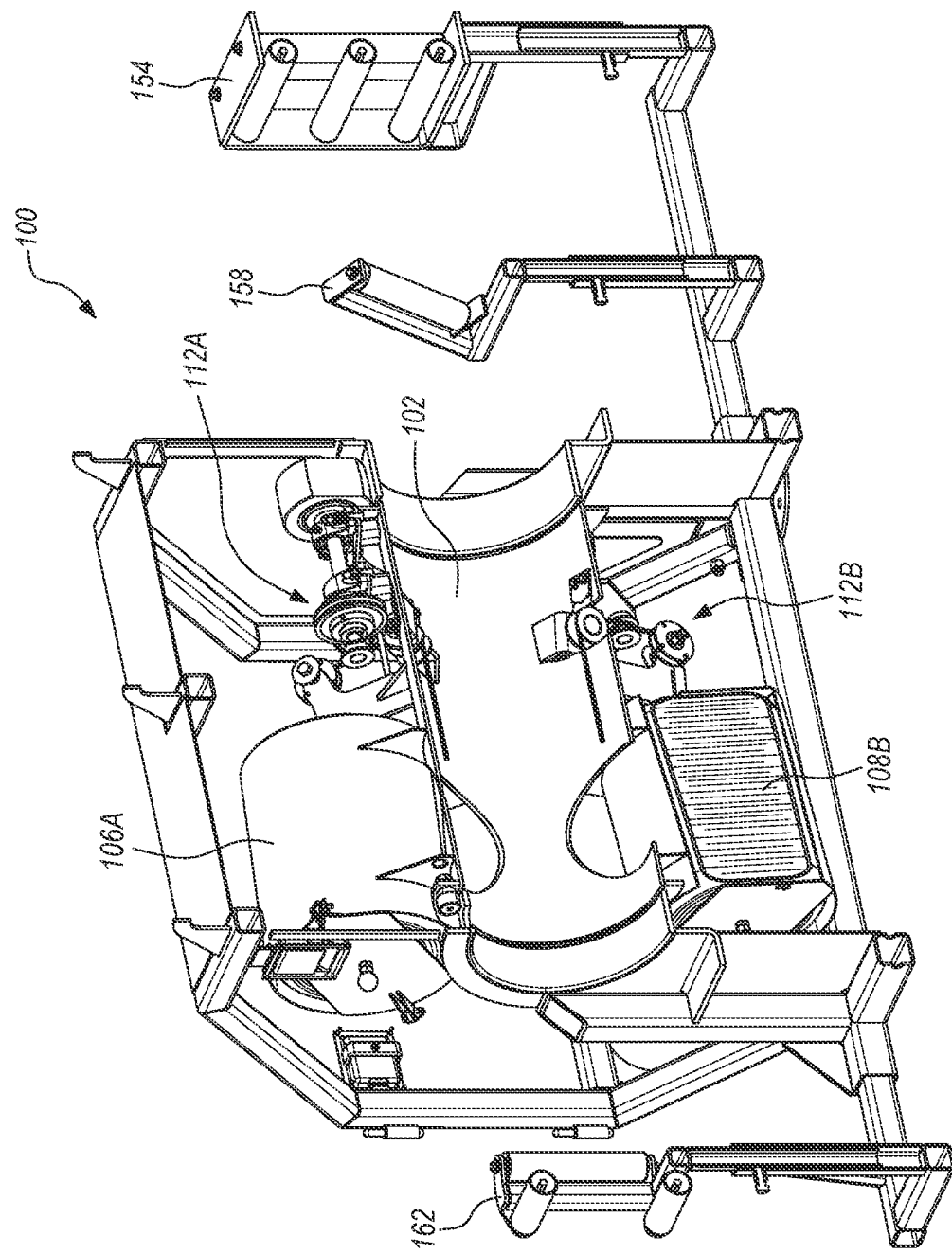
FIG. 11 illustrates a left side perspective longitudinal cross-section of a cable wrapper.
Figure 12:
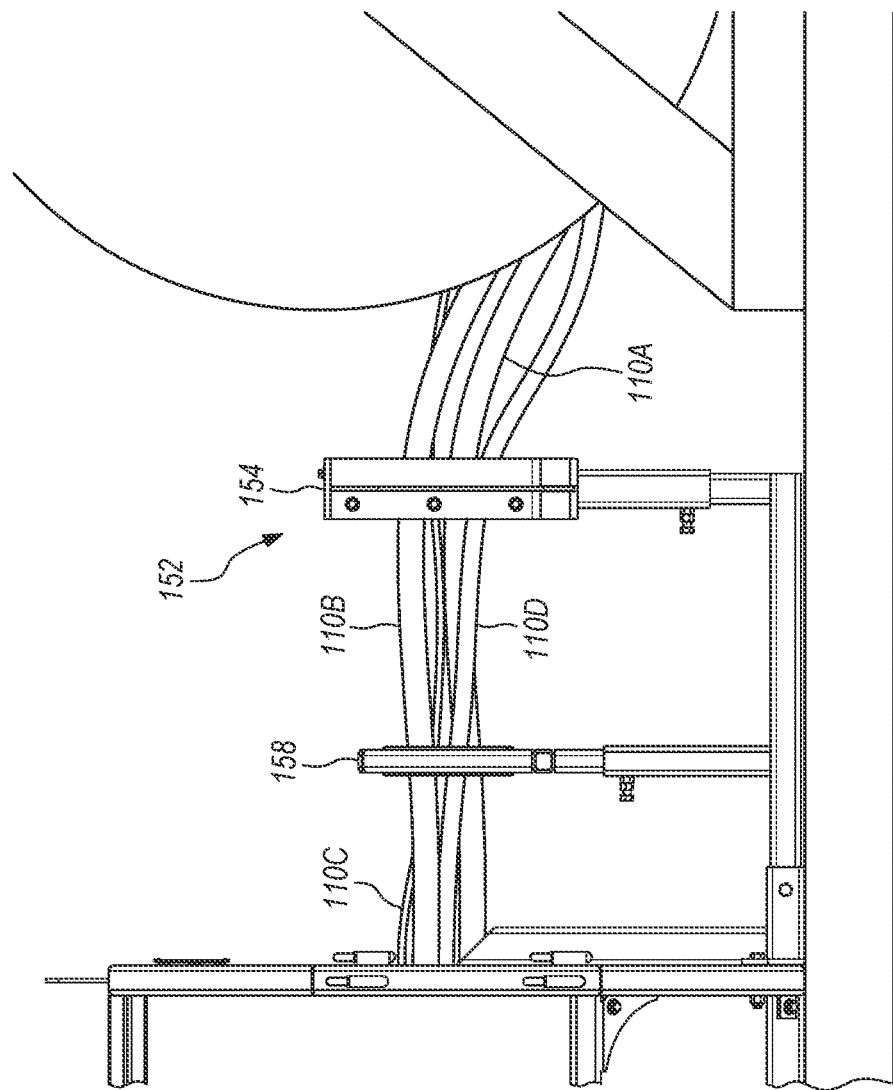
FIG. 12 illustrates a detailed front left side of a cable wrapper.
Figure 13:
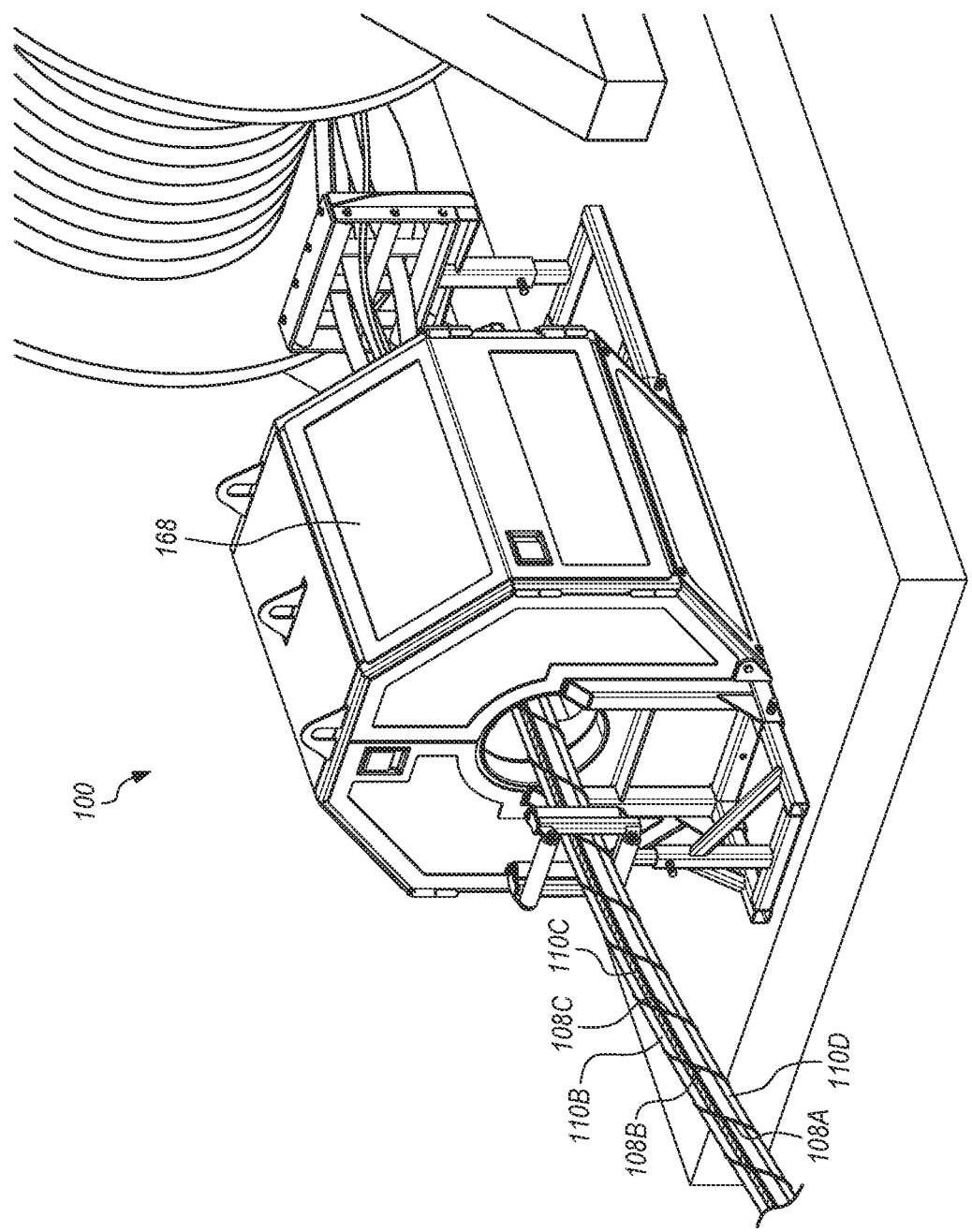
FIG. 13 illustrates a rear left side perspective view of a cable wrapper.
Figure 14:
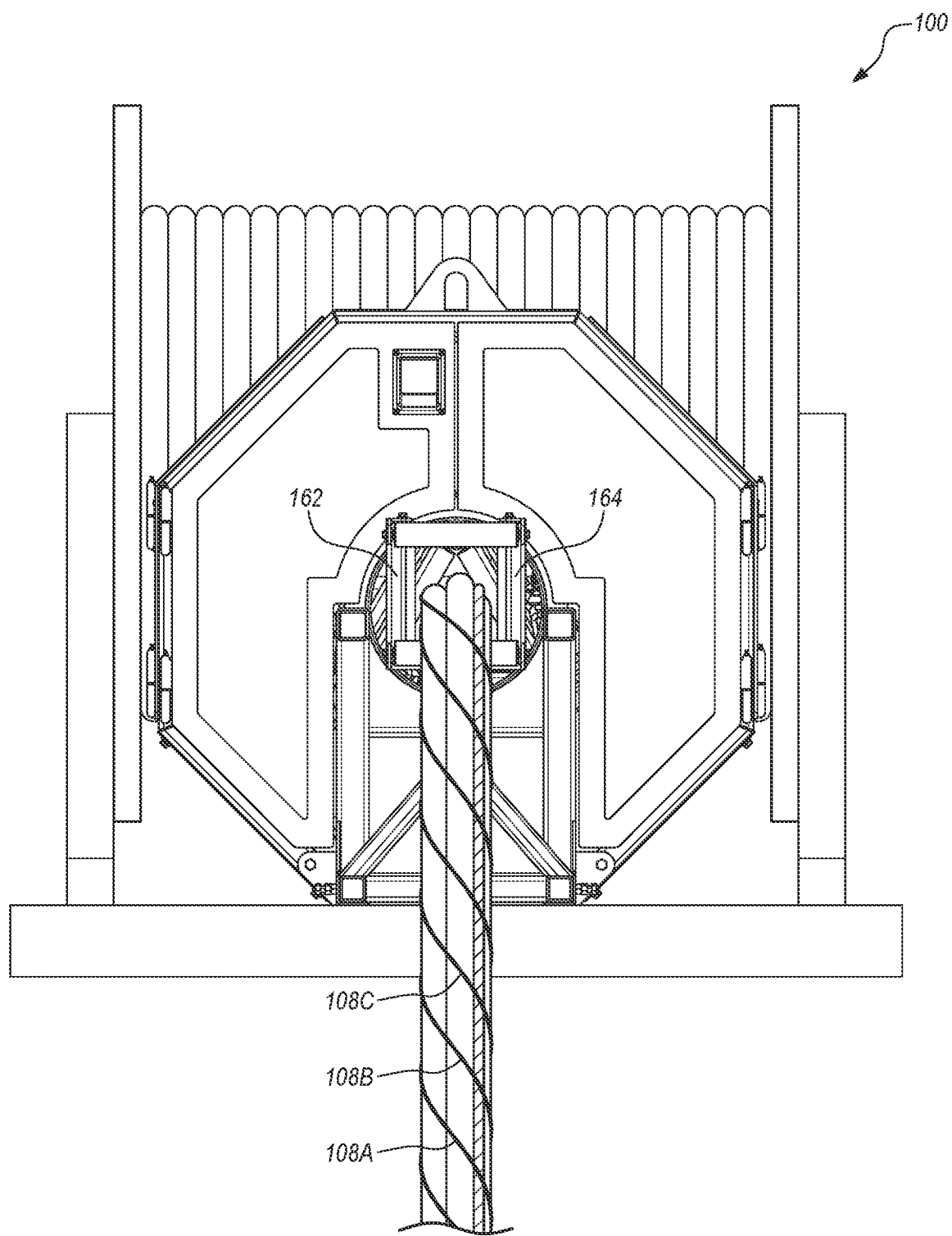
FIG. 14 illustrates a rear elevation view of a cable wrapper.
Figure 15:
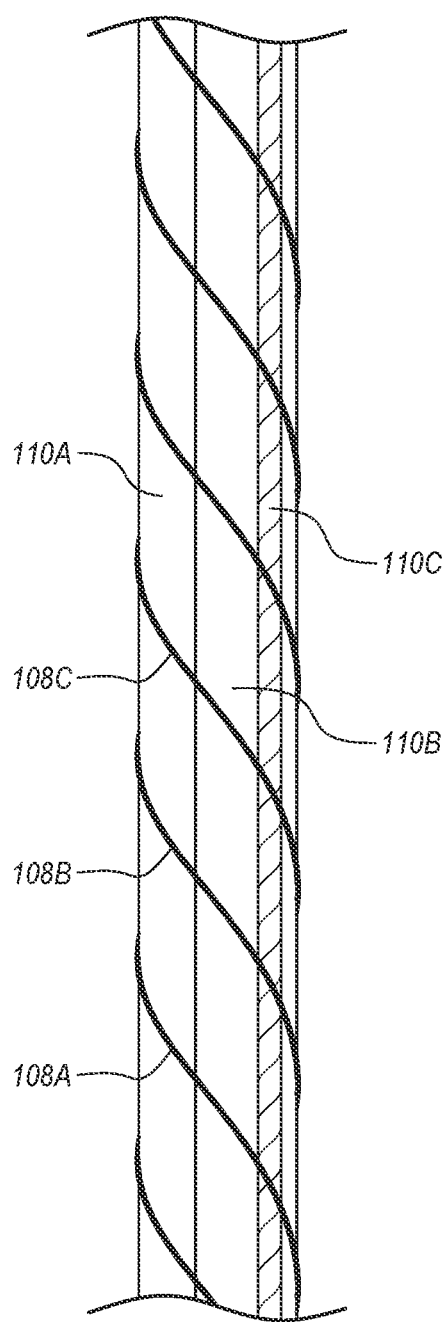
FIG. 15 illustrates wrapped cable as exiting the cable wrapper.
Figure 17:
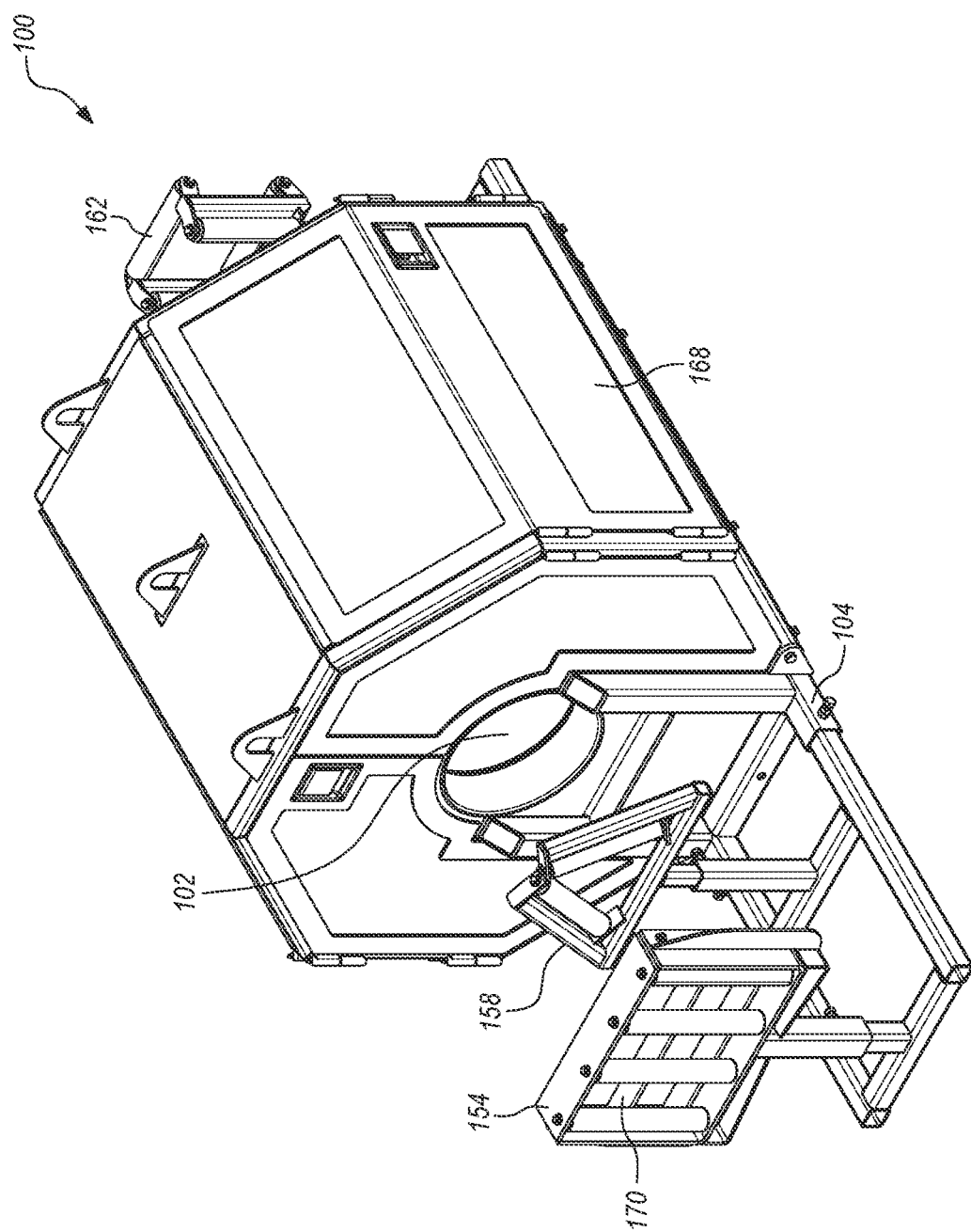
FIG. 17 illustrates a front, top right perspective view of a cable wrapper.

FIGS. 10-11 illustrate a longitudinal cross-section of the cable wrapper 100. FIG. 12 illustrates a plurality of cables 112A-D entering the cable wrapper 100 at first, front end 152. The cables are fed through an incoming cable indexer 154. As shown throughout the Figs., the indexer 154 may comprise one or more vertical rollers 156A-D so as to maintain the cable 110A-D orientation as they proceed to the carriage 102. A second, funneling frame 158 funnels the cables 110A-D into the carriage 102 in close proximity to one another so that they can be tightly wound. As shown in FIGS. 13-15, as the wrapped cables 110A-D exit the cable wrapper 100 through outgoing roller 160, which may comprise vertical rollers 162, 164. The wrapped cables 110A-D are then able to freely rest on the ground where desired. When the rolls of twine 108A-C are depleted, a user may open the twine compartments 106A-C via a rear access panel 166A-C, which may be hinged. A new roll of twine may be placed in each for continued use. As shown in FIG. 17, the cable wrapper 100 may further comprise a safety cage 168. It will be appreciated that the safety cage 168 prohibits items and users from coming into contact with the rotating components of the cable wrapper 100. The safety cage 168 may be coupled to a safety frame 169 that is coupled to the main frame 104.

Figure 16:
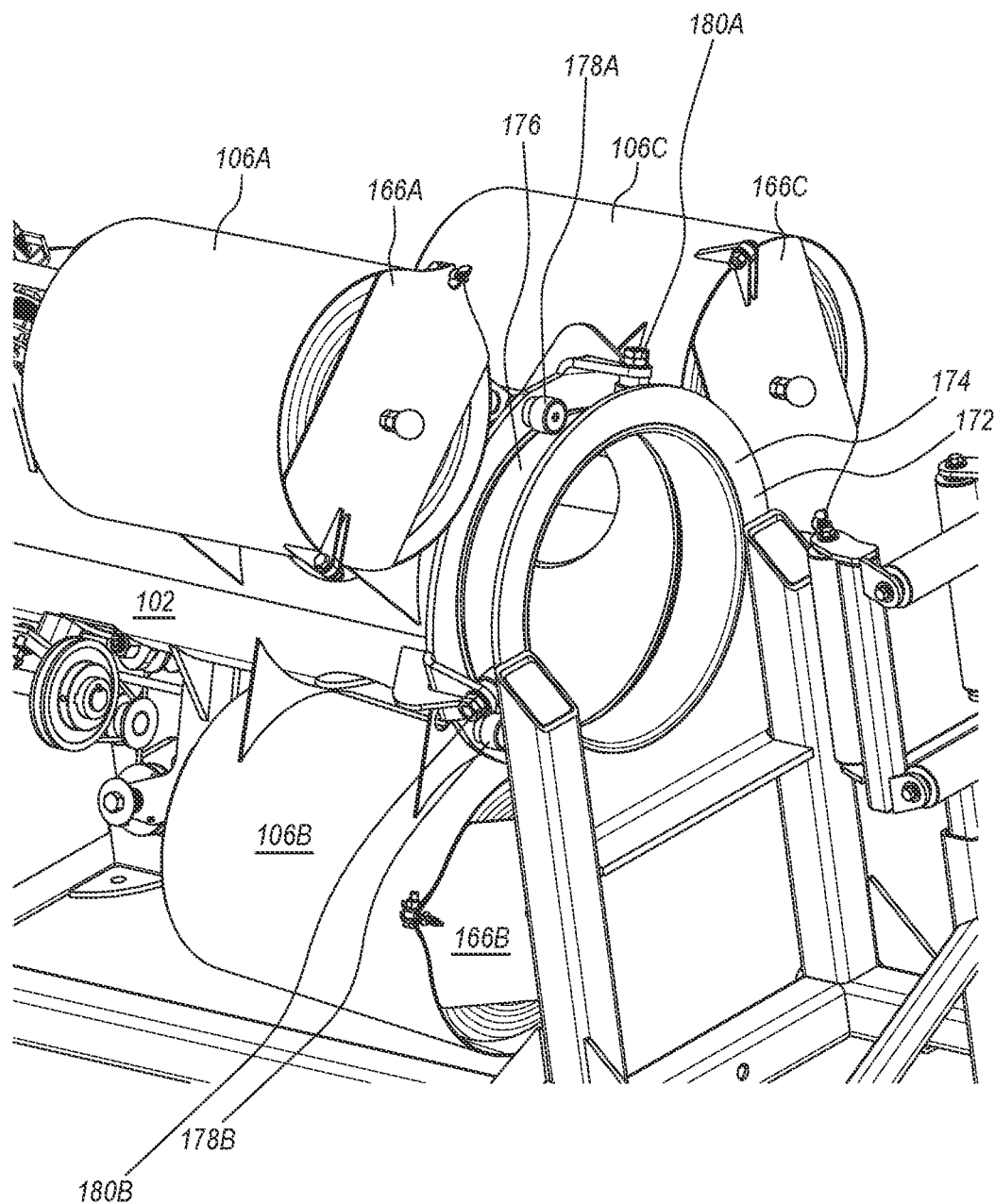
FIG. 16 illustrates a detailed front view of a cable wrapper.

Referring back to FIG. 16, a stationary roller race 172 comprises a vertical portion 174 and a horizontal portion 176. The carriage 102 comprises a plurality of first bearings 178A-B engaging the horizontal portion 176 and a plurality of second bearings 180A-B engaging the vertical portion 174. The plurality of first and second bearings 178, 180 ensure that the carriage 102 rotates smoothly and does not experience unexpected motion. In other words, with the wheels 124, 138 engaged in the wheel channel 128 and the first bearings 178 and second bearings 180 engaging the horizontal portion 176 and vertical portion 174, respectively, the carriage 102 rotates smoothly and does not experience unexpected motion.

The cables 110A-D described herein may be medium voltage cables or of any type desired to be bundled by a user. Additionally, as low as two cables 110A-B may be wrapped and may include more, including more than the four described above herein. For example, the incoming cable indexer 154 may further comprise a horizontal roller 170, allowing for six or more cables to pass therethrough. In some instances, the weight of the bundled cables 110A-D is sufficient such that as a truck pulls the cable wrapper 100 forward (such as on a trailer), the twine 108A-C and pulley systems 112A-C are actuated—no external force or power is needed, which is an incredible improvement over the prior art. If the cables are not of sufficient weight, they may be tethered such that they remain in position as the truck pulls the cable wrapper 100 forward. Again, no motors or other power, is needed to separately actuate the cable wrapper 100. As appreciated, the cable wrapper 100 may even be mounted to the same trailer that carries the spools of cables 110A-D for wrapping.

Accordingly, the cable wrapper solves the problems in the art, namely, the need for an apparatus that can efficiently wrap cables for in-ground placement, thereby more accurately securing the cables, reducing labor, and mitigating back injuries. Further, due to the speed with which the cables 110A-D may be placed, the overall construction is completed faster, allowing for greater profitability by the contractor and for quicker commercialization by the owner.

It will be appreciated that systems and methods according to certain embodiments of the present disclosure may include, incorporate, or otherwise comprise properties or features (e.g., components, members, elements, parts, and/or portions) described in other embodiments. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment unless so stated. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:

1. A cable wrapper, comprising:
   a main frame;
   a carriage rotatably coupled to the mainframe;
   a first twine compartment coupled to an outer surface of the carriage; and
   a first pulley system coupled to the first twine compartment and the outer surface of the carriage;
   wherein as a plurality of cables are pulled through the carriage, twine is pulled from the first twine compartment, through the first pulley system, and into the carriage to cause the carriage, the first twine compartment, and the first pulley system to rotate, thereby encircling the plurality of cables as they pass through the carriage.

2. The cable wrapper of claim 1, further comprising a second twine compartment coupled to the carriage and a second pulley system, wherein twine is fed from the second twine compartment, through the second pulley system, and into the carriage.

3. The cable wrapper of claim 2, further comprising a third twine compartment coupled to the carriage and a third pulley system, wherein twine is fed from the third twine compartment, through the third pulley system, and into the carriage.

4. The cable wrapper of claim 1, wherein the first pulley system comprises a first twine tensioner, a first guide first roller, a first v-belt pulley, and a first guide second roller.

5. The cable wrapper of claim 1, further comprising a first drive shaft and a first wheel driven by the first pulley system.

6. The cable wrapper of claim 1, further comprising an incoming cable indexer.

7. The cable wrapper of claim 6, further comprising a funneling frame.

8. The cable wrapper of claim 1, further comprising an outgoing roller.

9. The cable wrapper of claim 1, further comprising a safety cage.

10. A cable wrapper, comprising:
    a main frame and a safety frame;
    a carriage rotatably coupled to the main frame;
    a plurality of twine compartments, each of the plurality of twine compartments is coupled to an outer surface of the carriage; and a separate pulley system coupled to each twine compartment and the outer surface of the carriage;

wherein each pulley system comprises:
a twine tensioner,
a first guide roller,
a v-belt pulley, and
a second guide roller;

wherein each twine compartment is configured to receive a roll of twine and wherein each roll of twine is fed from the respective twine compartment, through the respective pulley system, and into the carriage where the twine is coupled to a plurality of cables; and as the plurality of cables pass through the carriage, the respective twine is pulled, thereby actuating a rotational motion of the carriage, the twine compartments, and the pulley systems, thereby wrapping the plurality of cables in the twine.

11. The cable wrapper of claim 10, wherein each pulley system is coupled to a respective drive shaft and wheel, the wheel riding in a wheel channel of the main frame.

12. The cable wrapper of claim 10, further comprising an incoming cable indexer.

13. The cable wrapper of claim 12, further comprising a funneling frame.

14. The cable wrapper of claim 10, further comprising an outgoing roller.

15. The cable wrapper of claim 10, further comprising a safety cage.

16. A method of wrapping cable using a cable wrapper, the method comprising:

feeding a plurality of cables into a carriage at a front end;

coupling twine to the plurality of cables as they exit a second end of the carriage, the twine is being pulled into the carriage from a twine compartment coupled an outer surface of the carriage;

as the twine exits the carriage, using a directional force of the twine and at least one pulley system, at least one drive shaft, and at least one wheel, to rotate the carriage, the twine compartment, and the pulley system, thereby winding the twine around the plurality of cables as they pass through the carriage, wherein the at least one pulley system is coupled to the twine compartment and the outer surface of the carriage.

17. The method of claim 16, further comprising using a plurality of twine compartments, each coupled to a respective pulley system, drive shaft, and wheel.

18. The method of claim 16, further comprising passing the plurality of cables through an incoming cable indexer.

19. The method of claim 18, further comprising passing the plurality of cables through a funneling frame.

20. The method of claim 16, further comprising passing the plurality of cables through an outgoing roller.

* * * * *